Patented Sept. 19, 1933

1,927,602

UNITED STATES PATENT OFFICE 1,927,602

PROCESS OF THE UTILIZATION OF THE TRIMMINGS OBTAINED FROM THE MANUFACTURE OF BASIC MAGNESIUM CARBONATE HEAT INSULATING MATERIALS

Russell B. Crowell and S. Ray Ebe, Agnew, Calif., assignors to American Solvents & Chemical Corporation, New York, N. Y., a corporation of Delaware No Drawing. Application November 10, 1928
Serial No. 318,584

8 Claims. (Cl. 23—67)

This invention relates to processes for treating trimmings containing basic magnesium carbonate obtained from the manufacture of magnesium containing heat insulating materials so as to recover the magnesium compound in a form suitable for reuse in heat insulating product manufacture.

Heat insulating materials containing basic magnesium carbonate are made by forming an admixture of basic magnesium carbonate and a binder such as asbestos, molding the mixture into the customary shapes, and then drying the molded product. In forming the heat insulating material the proportions of the binder and basic magnesium carbonate are so selected that the final product contains at least 85% of basic magnesium carbonate. In order to reduce the crude molded shapes of such heat insulating products to the desired size it is necessary to subject these molded shapes either to a milling or sawing operation. By this operation a considerable quantity of the insulating composition is removed from the molded shapes. These trimmings are usually in the form of a dust, and contain a high percentage of basic magnesium carbonate.

It has been attempted to utilize these trimmings resulting from the manufacture of magnesium carbonate containing heat insulating products by introducing a quantity of such trimmings into an admixture of basic magnesium carbonate and a binder such as asbestos prior to the molding thereof. This method has the marked disadvantage of materially increasing the weight of the finished product and decreasing the mechanical strength thereof.

It has been proposed to convert the insoluble basic magnesium carbonate contained in these trimmings into a soluble form of such compound by introducing carbon dioxide gas under high pressures into an aqueous suspension of such trimmings. This method has been found impractical due to the high pressures required, and the very limited conversion of the basic magnesium carbonate into the soluble hydrocarbonate.

By the process of the present invention it is possible to convert the basic magnesium carbonate contained in the trimmings obtained from the manufacture of magnesium carbonate containing heat insulating products into a form which makes the trimmings suitable for reuse in the process of making heat insulating products. According to the process of the present invention the basic magnesium carbonate contained in the trimmings can be converted into a soluble form in a simple, expedient, and commercially practical manner by subjecting a mass of such trimmings to the action of carbon dioxide gas of proper concentration. The concentration of the carbon dioxide gas employed should be such that it contains more than 75% of carbon dioxide, and preferably between 90% and 100% of carbon dioxide.

Accordingly, an object of this invention resides in the process for converting the insoluble basic magnesium carbonate contained in the trimmings resulting from the manufacture of magnesium carbonate containing insulating materials into basic magnesium carbonate having the desired physical properties as to enable it to be re-employed in the manufacture of heat insulating materials.

Another object of this invention resides in a process whereby it is possible to convert the insoluble basic magnesium carbonate contained in the trimmings resulting from the manufacture of magnesium carbonate containing insulating materials into the soluble hydrocarbonate form.

Other and further objects of the invention will appear from the more detailed description of the invention set forth hereinafter.

In carryng out this invention, about 240 lbs. of the trimmings containing basic magnesium carbonate resulting from the manufacture of heat insulating materials are suspended in about 1000 gals. of water contained in a vessel or tank capable of withstanding pressures up to 100 lbs. per square inch. The vessel or tank is provided with an inlet in the bottom thereof for the admission of a gas under pressure, and the top thereof is provided with a valved outlet for the discharge of the gas therefrom. Carbon dioxide gas of a high concentration, that is, containing more than 75% carbon dioxide, preferably between 90% and 100% carbon dioxide, is injected or forced into the tank or vessel through the inlet in the bottom thereof. The pressure in the tank or vessel is controlled by suitably adjusting the valve controlling the outlet through which the gas is permitted to escape. The temperature of the tank or vessel is maintained as low as possible, preferably at ordinary or room temperatures.

The basic magnesium carbonate contained in the trimmings is converted completely into a solution of magnesium hydrocarbonate in about 1 hour at a pressure of 60 to 85 lbs. per square inch by employing a carbon dioxide gas stream containing between 90 and 100% of carbon dioxide. The time and pressure required is determined by the concentration of the carbon dioxide used. While a carbon dioxide gas stream containing approximately 100% is preferred, carbon dioxide gas streams of lower concentrations may be employed equally as well by materially increasing the pressure. An industrial alcohol plant offers a satisfactory source of carbon dioxide gas of high concentration although any convenient source of carbon dioxide of proper concentration may be employed.

The solution contains magnesium hydrocarbonate in solution and asbestos fibre or binder in suspension. The asbestos fibre or binder may be left in the solution or filtered out if desired.

The magnesium hydrocarbonate solution of the trimmings thus formed may then be treated according to several methods to convert it into basic magnesium carbonate suitable for use in the manufacture of heat insulating products. The best method of treatment depends on the process being used to produce the original molded shapes. One of such methods consists in subjecting it to a vigorous agitation with a current of air. The air reduces the concentration of the carbon dioxide dissolved in the hydrocarbonate solution, thereby causing it to be decomposed, and the magnesium to be precipitated as basic magnesium carbonate. The precipitated basic magnesium carbonate is then separated in the form of a sludge by settling or filtering. The basic magnesium carbonate sludge may then be heated to convert it into the crystal form suitable for use in the manufacture of heat insulating products.

Another method of treating the magnesium hydrocarbonate solution obtained from the trimmings of heat insulating product manufacture comprises adding a magnesium compound such as calcined magnesite or magnesium oxide or hydroxide to the solution of magnesium hydrocarbonate, and then subjecting the resulting mixture to the action of carbon dioxide to complete the conversion of the magnesium oxide or hydroxide into basic magnesium carbonate. The hydrocarbonate solution gives up carbon dioxide to the magnesium oxide or hydroxide, and is thereby converted into basic magnesium carbonate. The amount of magnesium oxide added to the hydrocarbonate solution of the trimmings is such as to convert the hydrocarbonate into basic magnesium carbonate, and also produce after carbonization and subsequent heating, a molding sludge of correct density directly without settling or filtration. This procedure is especially adaptable to factories using the direct process of converting calcined magnesite or hydroxide into basic carbonate by carbonating the suspension of oxide, or hydroxide in water. The hydrocarbonate solution of the trimmings serves as the water for the suspension.

In factories employing the method of converting calcined dolomite, calcined magnesite, or hydroxide into magnesium hydrocarbonate and recovering from this solution the basic magnesium carbonate, the hydrocarbonate solution of the trimmings may be conveniently incorporated in the original hydrocarbonate solution or worked up separately.

By the process outlined herein it is possible to recover the basic magnesium carbonate contained in the trimmings resulting from the manufacture of heat insulating products. By this process basic magnesium carbonate is formed which possesses the desired physical properties, and hence can be re-utilized in the manufacture of heat insulating materials.

Having described my invention, what is desired to be secured by Letters Patent and claimed as new is:

1. The method of treating trimmings containing basic magnesium carbonate obtained from heat insulating product manufacture that have been subjected to baking or drying temperatures which comprises forming an aqueous suspension of said trimmings, and subjecting said suspension to the action of a carbon dioxide gas stream containing more than 75% carbon dioxide and under a pressure sufficiently high to effect substantial solution of said trimmings to form a solution of magnesium hydrocarbonate.

2. The method of treating trimmings containing basic magnesium carbonate obtained from heat insulating product manufacture that have been subjected to baking or drying temperatures which comprises forming an aqueous suspension of said trimmings, and subjecting said suspension to the action of a carbon dioxide gas stream containing more than 75% carbon dioxide at ordinary temperatures and under a pressure of 60 to 85 lbs. per square inch to form a solution of magnesium hydrocarbonate.

3. The method of treating trimmings containing basic magnesium carbonate obtained from heat insulating product manufacture that have been subjected to baking or drying temperatures which comprises forming an aqueous suspension of said trimmings, and subjecting said suspension to the action of a carbon dioxide gas stream containing 75% and 100% carbon dioxide at ordinary temperature and pressure of 60 to 85 pounds per square inch to form a solution of magnesium hydrocarbonate.

4. The method of treating trimmings containing basic magnesium carbonate obtained from heat insulating product manufacture that have been subjected to baking or drying temperatures which comprises forming an aqueous suspension of said trimmings, and subjecting said suspension to the action of a carbon dioxide gas stream under a pressure of 60 to 85 pounds per square inch and containing 90% to 100% of carbon dioxide to form a solution of magnesium hydrocarbonate.

5. The method of treating trimmings containing basic magnesium carbonate obtained from heat insulating product manufacture that have been subjected to baking or drying temperatures which comprises forming an aqueous suspension of said trimmings subjecting said suspension to the action of a carbon dioxide gas stream under a pressure of 60 to 85 pounds per square inch containing 75% to 100% carbon dioxide to form a solution of magnesium hydrocarbonate, and treating the hydrocarbonate while in solution so as to precipitate basic magnesium carbonate.

6. The method of treating trimmings containing basic magnesium carbonate obtained from heat insulating product manufacture that have been subjected to baking or drying temperatures which comprises forming an aqueous suspension of said trimmings, subjecting said suspension to the action of a carbon dioxide gas stream containing 90% to 100% of carbon dioxide and under a pressure of 60 to 85 pounds per square inch to form a solution of magnesium hydrocarbonate, and treating the hydrocarbonate solution so as to precipitate basic magnesium carbonate.

7. The method of treating trimmings containing basic magnesium carbonate obtained from heat insulating product manufacture that have been subjected to baking or drying temperatures which comprises forming an aqueous suspension of said trimmings, subjecting said suspension to the action of a carbon dioxide gas stream under a pressure of 60 to 85 pounds per square inch containing 75% to 100% carbon dioxide to form a solution of magnesium hydrocarbonate, adding magnesium oxide to said hydrocarbonate solution in an amount more than is required to convert the magnesium hydrocarbonate into basic magnesium carbonate, and subjecting the resulting mixture to the action of carbon dioxide.

8. The method of treating trimmings containing basic magnesium carbonate obtained from heat insulating product manufacture that have been subjected to baking or drying temperatures which comprises converting the basic magnesium carbonate into a hydrocarbonate solution, by treating an aqueous suspension of said trimmings with a carbon dioxide gas stream containing 75% to 100% of carbon dioxide under a pressure of 60 to 85 pounds per square inch, adding magnesium oxide or hydroxide to said hydrocarbonate solution in an amount more than is required to convert the hydrocarbonate solution into basic magnesium carbonate, and subjecting the resulting mixture to the action of carbon dioxide gas.

RUSSELL B. CROWELL.
S. RAY EBE.